US006813531B2

(12) United States Patent
Coale et al.

(10) Patent No.: US 6,813,531 B2
(45) Date of Patent: Nov. 2, 2004

(54) METHOD, SYSTEM, AND ARTICLE OF MANUFACTURE FOR PRODUCT CONFIGURATION

(75) Inventors: Jerry Lee Coale, Prineville, OR (US); Nicki Jo Rich, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/251,219

(22) Filed: Sep. 20, 2002

(65) Prior Publication Data

US 2004/0059447 A1 Mar. 25, 2004

(51) Int. Cl.⁷ .............................................. G06F 19/00
(52) U.S. Cl. ............................. 700/97; 700/9; 700/95; 709/219
(58) Field of Search ............................... 700/9, 95, 97, 700/219; 705/26, 203; 709/219

(56) References Cited

U.S. PATENT DOCUMENTS

| | | |
|---|---|---|
| 4,633,392 A | 12/1986 | Vincent et al. |
| 5,394,522 A | 2/1995 | Sanchez-Frank et al. |
| 5,579,482 A | 11/1996 | Einkauf et al. |
| 5,724,509 A | 3/1998 | Starkweather et al. |
| 5,758,071 A | 5/1998 | Burgess et al. |
| 5,764,909 A | 6/1998 | Nishimura |
| 5,805,897 A | 9/1998 | Glowny |
| 5,841,972 A | 11/1998 | Fanshier |
| 5,845,090 A | 12/1998 | Collins, III et al. |
| 5,875,306 A | 2/1999 | Bereiter |
| 5,877,966 A | 3/1999 | Morris et al. |
| 5,894,571 A | 4/1999 | O'Connor |
| 5,951,680 A | 9/1999 | Redlin et al. |
| 5,995,757 A | 11/1999 | Amberg et al. |
| RE36,444 E | 12/1999 | Sanchez-Frank et al. |
| 6,009,274 A | 12/1999 | Fletcher et al. |
| 6,041,347 A | 3/2000 | Harsham et al. |
| 6,061,332 A | 5/2000 | Branton, Jr. et al. |
| 6,064,982 A | 5/2000 | Puri |
| 6,066,182 A | 5/2000 | Wilde et al. |
| 6,092,189 A | 7/2000 | Fisher et al. |
| 6,138,153 A | 10/2000 | Collins, III et al. |
| 6,154,835 A | 11/2000 | Chrabaszcz et al. |
| 6,173,321 B1 | 1/2001 | Peterson et al. |
| 6,182,275 B1 | 1/2001 | Beelitz et al. |
| 6,202,070 B1 | 3/2001 | Nguyen et al. |
| 6,233,609 B1 | 5/2001 | Mittal |
| 6,236,901 B1 | 5/2001 | Goss |
| 6,243,747 B1 | 6/2001 | Lewis et al. |
| 6,243,815 B1 | 6/2001 | Antur et al. |
| 6,247,128 B1 | 6/2001 | Fisher et al. |

(List continued on next page.)

FOREIGN PATENT DOCUMENTS

JP 11068752 3/1999

OTHER PUBLICATIONS

IBM Corp., "System Configuration for a Multiple Node Computer System," Technical Disclosure Bulletin, vol. 27, No. 4B, Sep. 1984, pp. 2541–2546.

IBM Corp., "Visual Configurator System for Configuring and Ordering IBM Products," Technical Disclosure Bulletin, vol. 34, No. 12, May 1992, pp. 368–371.

IBM Corp., "IBM Enterprise Storage Server—Chapter 1—Introduction" [online] [retrieved on Jul. 3, 2002].

*Primary Examiner*—Albert W. Paladini
*Assistant Examiner*—Carlos R. Ortiz
(74) *Attorney, Agent, or Firm*—Rabindranath Dutta; Konrad, Raynes & Victor LLP (57) ABSTRACT

Provided are a method, system, and article of manufacture for product configuration. Order information is received for a product. Based on the received order information, configuration information for the product is generated via a simulator to simulate the product. The configuration information is sent, wherein the configuration information is used to configure the product.

47 Claims, 5 Drawing Sheets

U.S. PATENT DOCUMENTS

| | | |
|---|---|---|
| 6,263,382 B1 | 7/2001 | Bartlett et al. |
| 6,263,387 B1 | 7/2001 | Chrabaszcz |
| 6,295,556 B1 | 9/2001 | Falcon et al. |
| 6,304,901 B1 | 10/2001 | McCloghrie et al. |
| 6,317,815 B1 | 11/2001 | Mayer et al. |
| 6,347,331 B1 | 2/2002 | Dutcher et al. |
| 6,598,223 B1 * | 7/2003 | Vrhel et al. ............ 717/174 |
| 2001/0027483 A1 * | 10/2001 | Gupta et al. ............ 709/219 |
| 2002/0120521 A1 * | 8/2002 | Forth et al. ............ 705/26 |

* cited by examiner

METHOD, SYSTEM, AND ARTICLE OF MANUFACTURE FOR PRODUCT CONFIGURATION

BACKGROUND OF THE INVENTION

1. Field of the Invention

The present invention relates to a method, system, and an article of manufacture for product configuration.

2. Description of the Related Art

A storage subsystem, such as the International Business Machines ("IBM") Enterprise Storage Server ("ESS")**, may receive Input/Output (I/O) requests directed toward an attached storage system. The attached storage system may comprise an enclosure including numerous interconnected disk drives, such as a Direct Access Storage Device ("DASD"), a Redundant Array of Independent Disks ("RAID" Array), Just A Bunch of Disks ("JBOD"), etc. Further details of storage subsystems, such as the ESS, are described in the publication entitled "IBM Enterprise Storage Server" (copyright IBM Corp. 1999, 2001), which publication is incorporated herein by reference in its entirety.
≠**IBM and Enterprise Storage Server are trademarks of International Business Machines Corp.

A customer may order a storage subsystem in certain physical and logical configurations. The physical configuration may include the server type of the ESS unit, the type of the disk drives, etc. The logical configuration may include the network configuration of the various components of the storage subsystem, the partitioning of the disk drives, etc. A manufacturer may build, configure and deliver the storage subsystem to the customer based on the physical and logical configurations.

To facilitate the process of product ordering, manufacturing and delivery, a person, such as a storage specialist, may evaluate a customer's storage requirements and recommend a set of ESS features that would satisfy the expectations of the customer for storage capacity, performance, etc. The storage specialist may record a set of logical configurations based on the set of recommended ESS features. The customer may send a purchase order to the manufacturer based on the recommendations of the storage specialist. Once the ESS unit is delivered, the ESS unit may be configured based on the recorded set of logical configurations.

Notwithstanding the prior art techniques for product ordering, manufacturing and configuration, there is a need in the art for improved techniques for product ordering, manufacturing and configuration.

SUMMARY OF THE PREFERRED EMBODIMENTS

Provided are a method, system, and article of manufacture for product configuration. Order information is received for a product. Based on the received order information, configuration information for the product is generated via a simulator to simulate the product. The configuration information is sent, wherein the configuration information is used to configure the product.

Additional implementations are provided, wherein subsequent to generating the configuration information and prior to configuring the product, the configuration information is sent to a sender of the order information. An approval of the configuration information is received from the sender of the order information.

Further implementations are provided, wherein a generator of the configuration information interacts with a sender of the order information to modify the order information based on potential valid configurations of the product generated by the simulator. Additional implementations are provided, wherein the simulator can simulate instances of a plurality of products and can check for valid configurations for each instance.

Implementations of the invention enable the delivery of a product, that is manufactured and configured according to a customer order information with the aid of a configuration application. The configuration application ensures that the customer order information is valid by simulating potential configurations of the corresponding product on a simulator.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
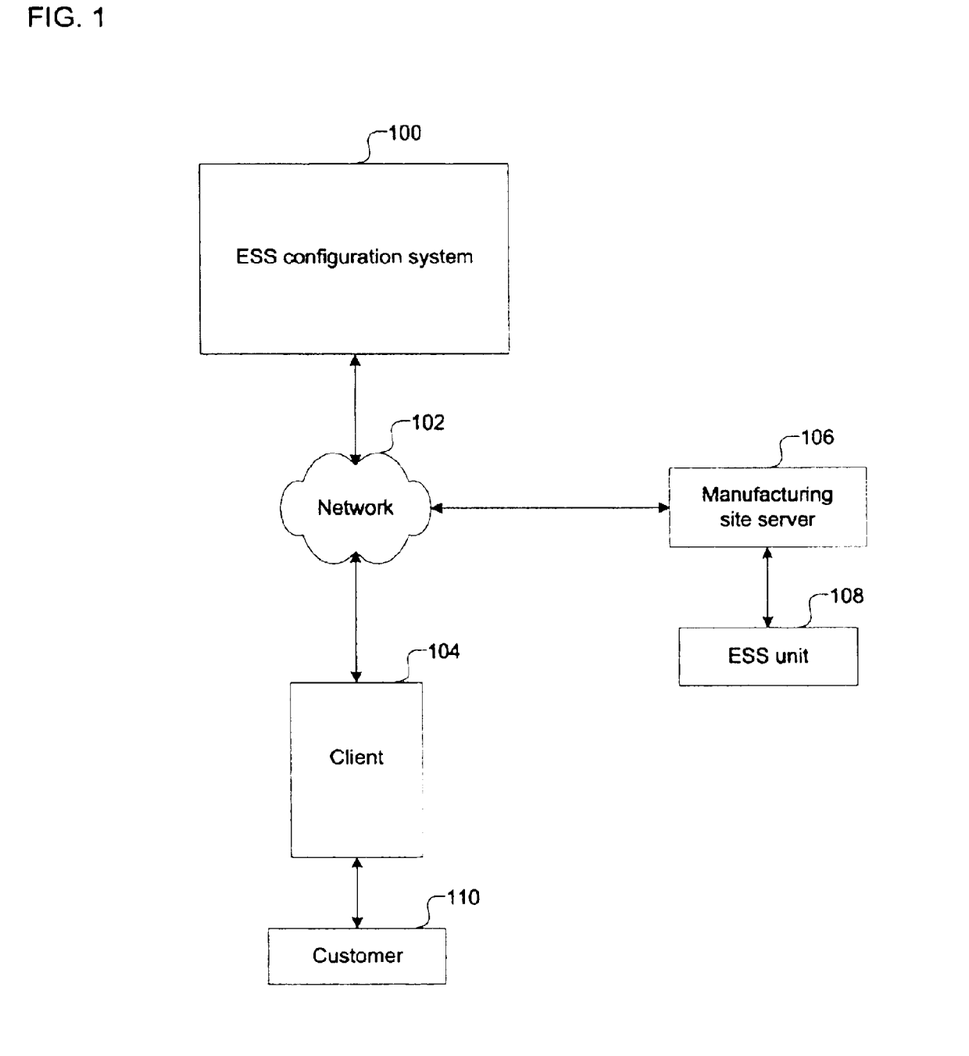
FIG. 1 illustrates a block diagram of a computing environment in which certain described aspects of the invention are implemented.

FIG. 1 illustrates a block diagram of a computing environment in which certain aspects of the invention are implemented. An ESS configuration system 100 may be connected via a network 102 to a client 104 and a manufacturing site server 106. The manufacturing site server 106 may be coupled to an ESS unit 108. A customer 110 may interact via the client 104 to exchange information with the ESS configuration server 100 regarding the purchase, manufacture, and logical configuration of the ESS unit 108. Based on the interaction between the ESS configuration server 100 and the customer 110 via the client 104, the ESS configuration server 100 may send information to the manufacturing site server 106 on the purchase, manufacture, and logical configuration of the ESS unit 108. The manufacturing site server 106 may be located at a manufacturing site and may provide information for the manufacture and logical configuration of the ESS unit 108.

The ESS configuration system 100, the client 104, and the manufacturing site server 106 may be any computational device known in the art, such as a personal computer, a workstation, a server, a mainframe, a hand held computer, a palm top computer, a telephony device, network appliance etc. The network 102 may be any network known in the art, such as the Internet, an intranet, a Local area network (LAN), a Storage area network (SAN), a Wide area network (WAN), a wireless network etc. The ESS configuration system 100 may alternatively be connected to the client 104 and the manufacturing site server 106 without a network, such as through direct lines, common bus systems etc., in a manner known in the art. Also the network 102 may be part of one or more larger networks or may be an independent network or may be comprised of multiple interconnected networks. In addition, in certain implementations functions performed by the client 104 may be performed by the ESS configuration server 100. The ESS configuration system 100, the client 104 and the manufacturing site server 106 may communicate in a client-server paradigm, in a peer-to-peer paradigm or any other paradigm known in the art.

In alternative implementations of the invention, an automated computer program may perform the interactions performed by the customer 110 via the client 104. The automated computer program may reside on the client 104. In certain implementations of the invention, the ESS configuration system 100 may perform some or all of the functions of the manufacturing site server 106.

In certain implementations of the invention, automated processes or persons may retrieve information on the manufacture and logical configuration of the ESS unit 108 from the manufacturing site server 106 and manufacture and logically configure the ESS unit 108. In certain implementations, the ESS unit 108 maybe connected to the manufacturing site server 106 after the ESS unit 108 is manufactured. The ESS unit 108 may then receive information from the manufacturing site server 106 and undergo a logical configuration.

Figure 2:
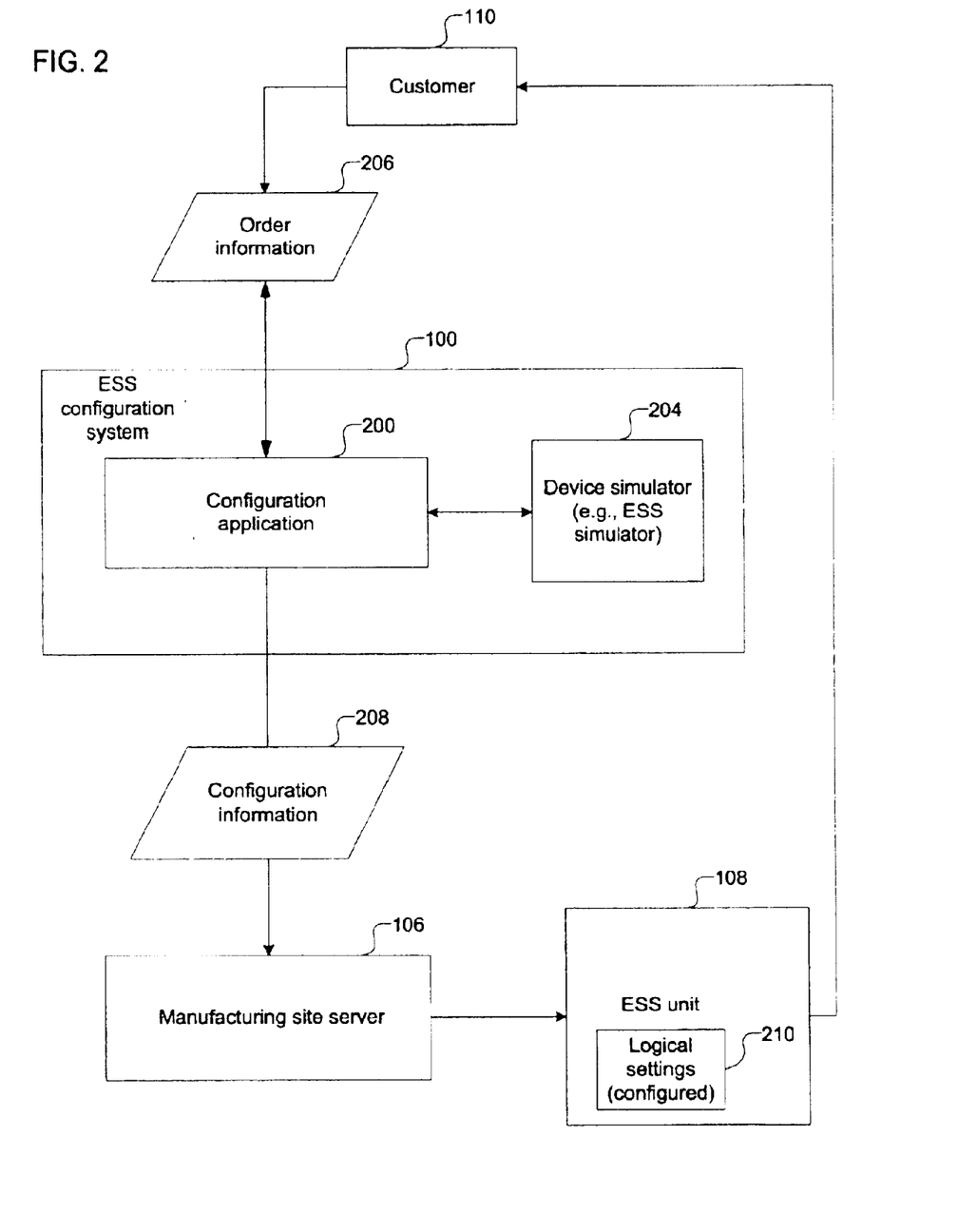
FIG. 2 illustrates a block diagram including a configuration application and a device simulator, in accordance with certain described implementations of the invention.

FIG. 2 illustrates a block diagram including a configuration application 200 and a device simulator 204 (e.g., an ESS simulator) implemented in the ESS configuration system 100, in accordance with certain implementations of the invention. The configuration application 200 and the device simulator 204 may be implemented in any programming language known in the art and may execute either on the ESS configuration system 100 or maybe hosted or executed remotely from the ESS configuration system 100. The device simulator 204 may simulate one or more ESS units where the ESS units may be of a plurality of types. The device simulator 204 may also allow for the software simulation of various logical configurations of the storage disks, etc., on one or more ESS units.

The configuration application 200 may receive order information 206 from the customer 110. The order information 206 may comprise information related to the purchase of the ESS unit 108, such as a type of the ESS unit 108. The configuration software 200 may then analyze the order information 206 and simulate an ESS unit corresponding to the order information 206 on the device simulator 204. Based on the simulation and the order information the configuration application 200 may generate configuration information 208 that includes the specifications for the manufacture and logical configuration of an ESS unit, such as the ESS unit 108.

The ESS configuration server 100 may send the configuration information 208 to the manufacturing site server 106. Based on the information received at the manufacturing site server 106, the ESS unit 108 may be manufactured. Logical settings 210 included in the manufactured ESS unit 108 maybe configured in conformance with the configuration information 208. The logical settings 210 may include any logical settings of an ESS unit known in the art, such as, partitions of the storage space on the ESS unit 108.

In alternative implementations of the invention, the order information 206 may be sent from the customer 110 to the ESS configuration system 100 via a storage medium, such as, a floppy diskette. Similarly the configuration information 208 may also be sent from the ESS configuration system to the manufacturing site server via a storage medium, such as, a floppy diskette. In certain implementations of the invention, the order information 206 and the configuration information 208 may be communicated by printing the communication information 206 and the configuration information 208 on paper. In alternative implementations of the invention, the client 104 maybe included in the ESS configuration system 100, and the customer may input the order information 206 in the ESS configuration system 100.

Figure 3:
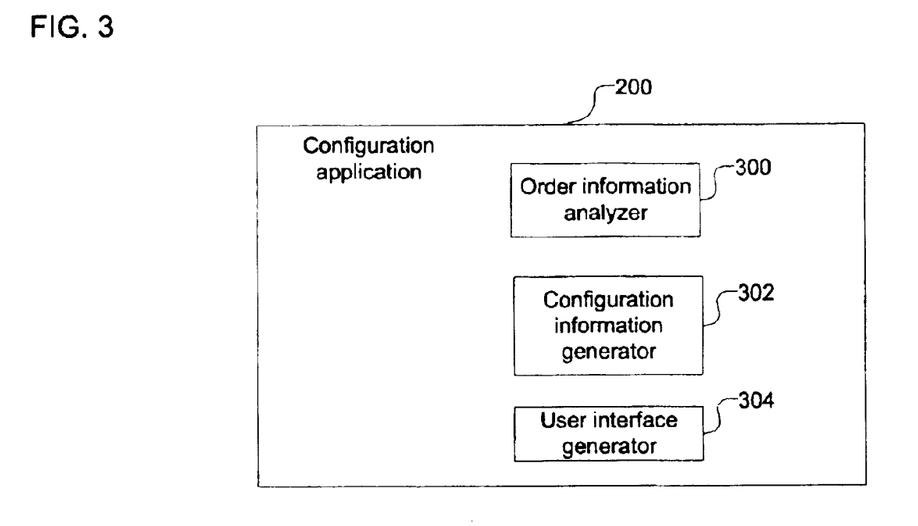
FIG. 3 illustrates a block diagram of a configuration application, in accordance with certain described implementations of the invention.

FIG. 3 illustrates a block diagram of the configuration application 200 included in the ESS configuration system 100, in accordance with certain implementations of the invention. The configuration application 200 may include an order information analyzer 300, where the order information analyzer 200 may analyze the order information 206 received from the customer 110. The analysis may include determining if the order information 206 includes a valid type of ESS unit that may be manufactured and configured.

The configuration application 200 may also include a configuration information generator 302, that generates the configuration information 208 to be sent to the manufacturing site server 106. The configuration application 200 receives the order information 206, analyzes the order information via the device simulator 204, and based on the analysis the configuration information generator 302 generates the configuration information 208.

The configuration application 200 may also include a user interface generator 304 that enables a graphical display to be displayed on the client 104. The graphical display on the client 104 may enable interactions of the customer 110 with the configuration application 200.

Figure 4:
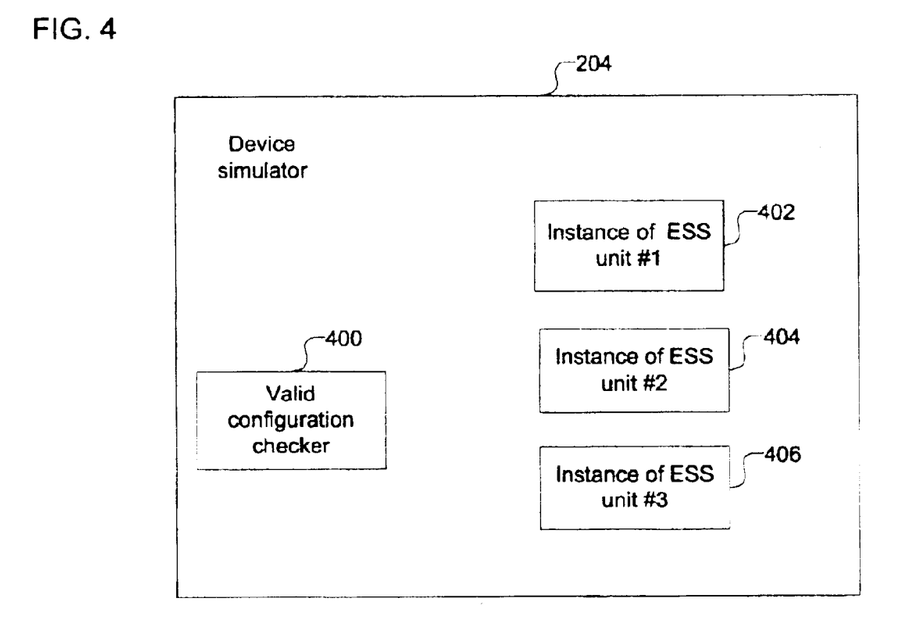
FIG. 4 illustrates a block diagram of a device simulator, in accordance with certain described implementations of the invention.

FIG. 4 illustrates a block diagram of the device simulator 204, included in the ESS configuration system 100, in accordance with certain implementations of the invention. The device simulator 204 may simulate devices, such as a plurality of physical ESS units, in a manner known in the art. For example, the physical elements, operations, and connectivity of an ESS unit may be simulated by the device simulator 204. The simulation by the device simulator 204 may include the simulation of various physical and logical configurations of ESS units, including any storage devices coupled to the ESS units. The device simulator 204 may include a valid configuration checker 400, and may include instances of multiple physical ESS units (labeled by reference numerals 402, 404, 406) that are under simulation in the device simulator 204. The valid configuration checker 400 may determine the validity of various configurations of an ESS unit based on simulated instances of the ESS unit.

Figure 5:
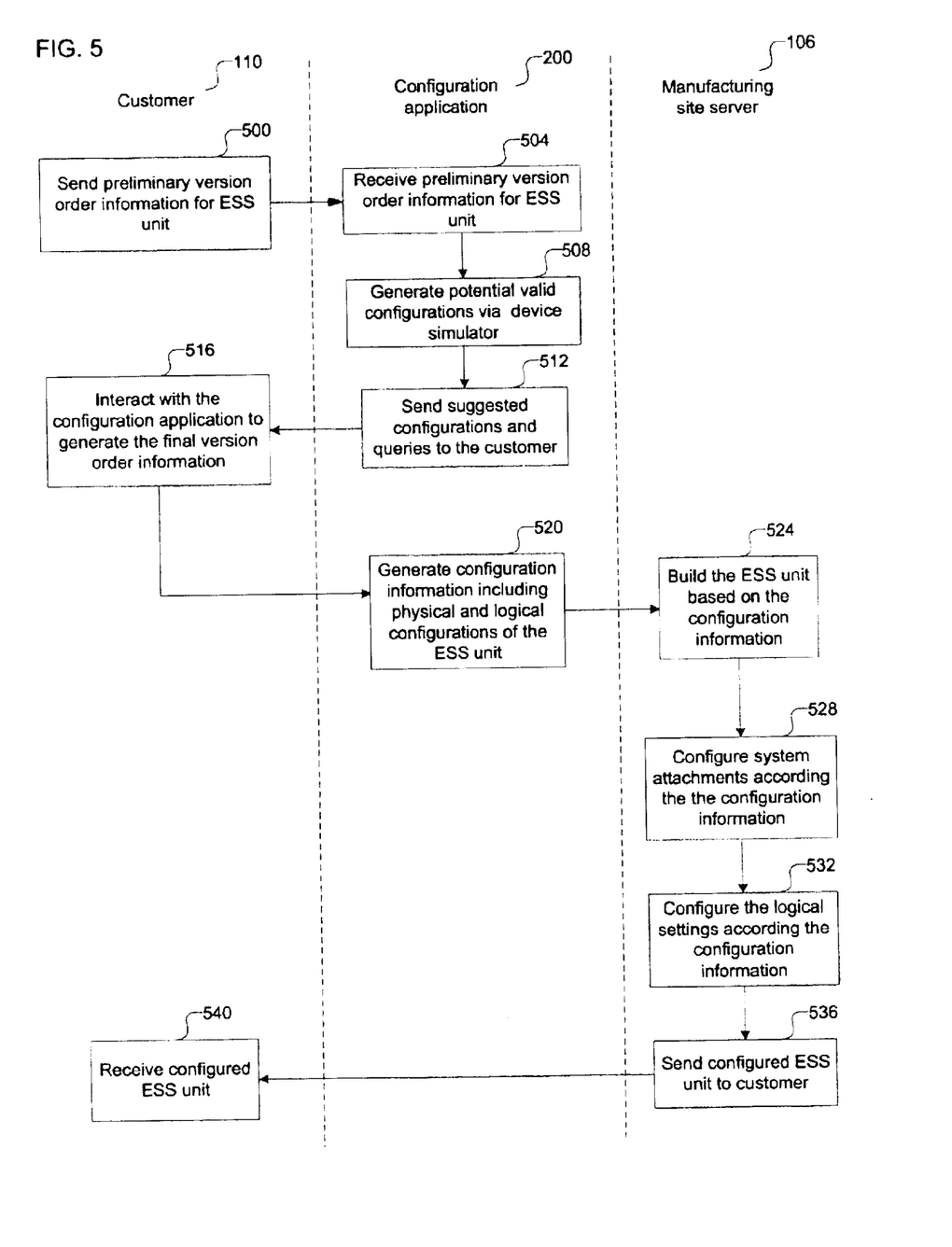
FIG. 5 illustrates logic for product ordering, manufacturing and delivery, in accordance with certain described implementations of the invention.

FIG. 5 illustrates logic for product ordering, manufacturing and delivery of the ESS unit 108 to the customer 110, in accordance with certain implementations of the invention. The process starts at block 500, where the customer 110 via the client 104 sends a preliminary version of the order information 206 to the ESS configuration system 100. In certain implementations, at block 500, the preliminary order information 206 may include a plurality machine types of the ESS unit 108 that the customer 110 may wish to order. Control proceeds to block 504, where the order information analyzer 300 included in the configuration application 200 coupled to the ESS configuration system 100 receives the preliminary version of the order information 206.

Control proceeds to block 508, where the order information analyzer 300 analyzes the preliminary order information 206 and based on the analyzed preliminary order information 206 requests the device simulator 204 to generate valid configurations of the ESS unit 108. The device simulator 204 may simulate one or more instances of the ESS unit 108 and the valid configuration checker 400 may check whether the simulated instances of the ESS unit 108 underwent the proper simulation (i.e., the simulated instance of the ESS unit was functional and was expected to provided appropriate levels of performance, where the appropriate level of performance may be determined by any method known in the art). The device simulator 204 may return one or more valid configurations to the configuration application 200.

Control proceeds to block 512, where the configuration application 200 sends the one or more configurations of the ESS unit 108 to the customer 110. At block 516, the customer 110 receives the one or more configurations of the ESS unit 108 and interacts with the configuration application 200 to generate the final version of the order information 206. In certain implementations, the interaction may include changing the preliminary version of the order information 206, and repeating the simulation performed in block 508.

Control proceeds to block 520, where the configuration application 200 receives the final version of the order information 206. The final version of the order information 206 is based on a valid configuration of the ESS unit 108. The configuration information generator 302 included in the configuration software 200 generates the configuration information 208 based on the valid configuration of the ESS unit 108. The configuration information 208 is in a format that can be interpreted by software residing on the manufacturing site server 106. The configuration application 200 sends the configuration information 208 to the manufacturing site server 106 that may be located at a manufacturing site. In alternative implementations of the invention, the configuration information 208 may be sent to the manufacturing site server via a storage media, such as a floppy diskette.

Control proceeds to block 524, where the configuration information 208 may be extracted from the manufacturing site server 106. The extraction may be performed at a manufacturing site. The ESS unit 108 may be physically manufactured according to the specifications included in the configuration information 208.

Control proceeds to block 528, where system attachments of the ESS unit (e.g., the connectivity of the components comprising the ESS unit 108, host system attachments, etc.) are implemented according to the configuration information 208. Control proceeds to block 532, where the logical settings 210 of the ESS unit 108 are configured according to the configuration information 208.

Control process to block 536, where the configured ESS unit 108 is sent to the customer 110. The customer 110, receives (at block 540) the configured ESS unit 108. Implementations of the invention configure the ESS unit 108 according to the order information 206 of the customer 110.

While the implementations of the invention have been described with reference to an ESS unit, alternative implementations may manufacture and configure a product that is not an ESS unit. For example, alternative implementations may manufacture and configure a numerically controlled machine or a personal computer. Furthermore, in the implementations an enterprise storage server includes any enterprise level storage server known in the art.

Implementations of the invention enable the delivery of a product, such as an ESS unit, that is manufactured as well as physically and logically configured according to a customer order information, where the customer order information may be generated interactively by the customer with the aid of a configuration application. The configuration application ensures that the customer order information is valid by simulating potential configurations of the corresponding product on a device simulator.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 6:
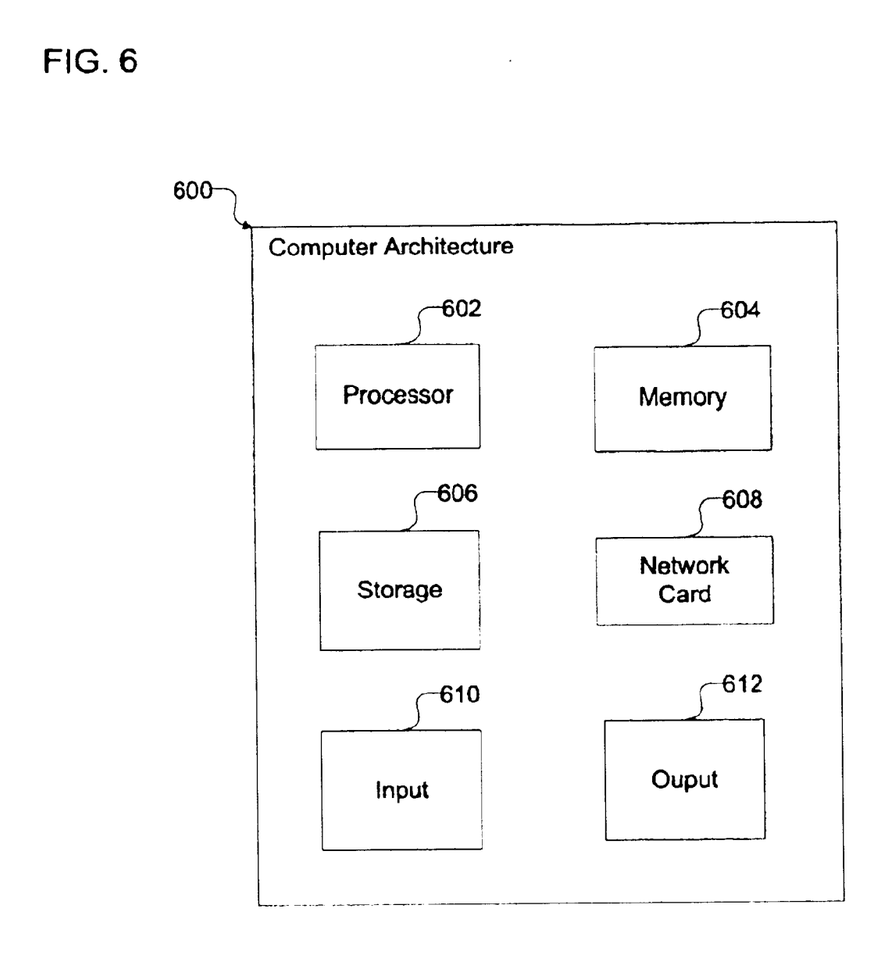
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one implementation of the ESS configuration system 100, the client 102, and the manufacturing site server 106. The ESS configuration system 100, the client 102, and the manufacturing site server 106 may implement a computer architecture 600 having a processor 602, a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIG. 5 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for product configuration, comprising:
   receiving, at a second computational device, order information from a first computational device, wherein the order information is for an enterprise storage server;
   based on the received order information, generating configuration information for the enterprise storage server via a simulator to simulate the enterprise storage server, wherein the simulator is in the second computational device; and
   sending the configuration information to a third computational device, wherein the enterprise storage server is configured by the third computational device based on the configuration information, and wherein configuration of the enterprise storage server includes storage partitioning.

2. The method of claim 1, further comprising:
   subsequent to generating the configuration information and prior to configuring the enterprise storage server, sending the configuration information to a sender of the order information; and
   receiving an approval of the configuration information from the sender of the order information.

3. The method of claim 1, wherein a generator of the configuration information interacts with a sender of the order information to modify the order information based on potential valid configurations of the enterprise storage server generated by the simulator.

4. The method of claim 1, wherein the enterprise storage server comprises a server and one or more storage devices, wherein the receiving, generating and sending is preformed by a configuration application, and wherein the configuration application enables interaction with a sender of the purchase order via a graphical user interface.

5. The method of claim 1, wherein receiving the order information occurs in a batch mode.

6. The method of claim 1, wherein the order information is received in an interactive mode.

7. The method of claim 1, wherein the simulator can simulate instances of a plurality of enterprise storage servers and can check for valid configurations for each instance.

8. The method of claim 1, wherein the configuration information is processed to manufacture the enterprise storage server prior to configuring the enterprise storage server, and wherein the configured enterprise storage server is sent to the sender of the order information.

9. The method of claim 1, wherein the configuration information includes logical configuration information for the enterprise storage server.

10. The method of claim 9, wherein the logical configuration information includes storage partitioning information for the enterprise storage server.

11. A system for product configuration, wherein the system is in communication with a first computational device and a second computational device, the system comprising:
   (i) a processor;
   (ii) a computer readable medium accessible to the processor;
   (iii) a simulator, wherein the simulator can simulate an enterprise storage server, and wherein the simulator is stored in the computer readable medium; and
   (iv) program logic including code capable of causing the processor to perform:
      (a) receiving, order information from the first computational device, wherein the order information is for the enterprise storage server;
      (b) generating configuration information for the enterprise storage server via the simulator based on the received order information and a simulation of the enterprise storage server by the simulator; and
      (c) sending the configuration information to the second computations device, wherein the configuration information is used by the second computational device to configure the enterprise storage server, and wherein configuration of the enterprise storage server includes storage partitioning.

12. The system of claim 11, wherein the processor further performs:
   sending the configuration information to a sender of the order information; and
   receiving an approval of the configuration information from the sender of the order information.

13. The system of claim 11, further comprising:
   a generator of the configuration information, wherein the generator interacts with a sender of the order information to modify the order information based on potential valid configurations of the enterprise storage server generated by the simulator.

14. The system of claim 11, wherein the enterprise storage server comprises a server and one or more storage devices, and further comprising:
   a configuration application, wherein the receiving, the generating and the sending is performed by the configuration application, and wherein the configuration application enables interaction with a sender of the purchase order via a graphical user interface.

15. The system of claim 11, wherein the order information is received in a batch mode.

16. The system of claim 11, wherein the order information is received in an interactive mode.

17. The system of claim 11, wherein the simulator can simulate instances of a plurality of enterprise storage servers and can check for valid configurations for each instance.

18. The system of claim 11, wherein the configuration information is processed to manufacture the enterprise storage server prior to configuring the enterprise storage server, and wherein the configured enterprise storage server is sent to the sender of the order information.

19. The system of claim 11, wherein the configuration information includes logical configuration information for the enterprise storage server.

20. The system of claim 19, wherein the logical configuration information includes storage partitioning information for the enterprise storage server.

21. An article of manufacture for product configuration, wherein article of manufacture is in communication with a first computational device and a second computational device, wherein the article of manufacture is capable of causing operations, the operations comprising:
receiving, order information from the first computational device, wherein the order information is for an enterprise storage server;
based on the received order information, generating configuration information for the enterprise storage server via a simulator to simulate the enterprise storage server, wherein the simulator is in the second computational device; and
sending the configuration information to the second computational device, wherein the enterprise storage server is configured by the second computational device bused on the configuration information, and wherein configuration of the enterprise storage server includes storage partitioning.

22. The article of manufacture of claim 21, the operations further comprising:
subsequent to generating the configuration information and prior to configuring the enterprise storage server, sending the configuration information to a sender of the order information; and
receiving an approval of the configuration information from the sender of the order information.

23. The article of manufacture of claim 21, wherein a generator of the configuration information interacts with a sender of the order information to modify the order information based on potential valid configurations of the enterprise storage server generated by the simulator.

24. The article of manufacture of claim 21, wherein the enterprise storage server comprises a server and one or more storage devices, wherein the receiving, generating and sending is preformed by a configuration application, and wherein the configuration application enables interaction with a sender of the purchase order via a graphical user interface.

25. The article of manufacture of claim 21, wherein the order information is received in a batch mode.

26. The article of manufacture of claim 21, wherein the order information is received in an interactive mode.

27. The article of manufacture of claim 21, wherein the simulator can simulate instances of a plurality of enterprise storage servers and can check for valid configurations for each instance.

28. The article of manufacture of claim 21, wherein the configuration information is processed to manufacture the enterprise storage server prior to configuring the enterprise storage server, and wherein the configured enterprise storage server is sent to the sender of the order information.

29. The article of manufacture of claim 21, wherein the configuration information includes logical configuration information for the enterprise storage server.

30. The article of manufacture of claim 29, wherein the logical configuration information includes storage partitioning information for the enterprise storage server.

31. A system for product configuration, wherein the system is in communication with a first computational device and a second computational device, the system comprising:
a simulator, wherein the simulator can simulate an enterprise storage server;
means for receiving, order information from the first computational device, wherein the order information is for an enterprise storage server;
means for generating configuration information for the enterprise storage server via the simulator based on the received order information and a simulation of the enterprise storage server by the simulator; and
means for sending the configuration information to a second computational device, wherein the configuration information is used by the second computational device to configure the enterprise storage server, and wherein configuration of the enterprise storage server includes storage partitioning.

32. The method of claim 1, wherein the enterprise storage server is an enterprise storage server unit, wherein the simulator is capable of simulating physical elements, operations, and connectivity of the enterprise storage server unit, and wherein the simulator is capable of simulating various logical configurations of storage disks coupled to the enterprise storage server unit.

33. The method of claim 1, wherein the enterprise storage server is an enterprise storage server unit, and wherein the simulator comprises of:
a plurality of simulated instances of the enterprise storage server unit that is under simulation in the simulator; and
a valid configuration checker, wherein the valid configuration checker determines validity of various configurations of the enterprise storage server unit based on the simulated instances of the enterprise storage server unit.

34. The method of claim 1, wherein the generated configuration information is sent from the second computational device that includes the simulator to the third computational device, wherein the third computational device includes information for manufacture and logical configuration of the enterprise storage server, the method further comprising:
manufacturing the enterprise storage server based on the configuration information sent to the third computational device;
configuring system attachments of the enterprise storage server based on the configuration information sent to the third computational device; and
configuring logical settings of the enterprise storage server based on the configuration information sent to the third computational device.

35. The method of claim 34, wherein the enterprise storage server is an enterprise storage server unit, wherein the simulator is capable of simulating physical elements, operations, and connectivity of the enterprise storage server unit, wherein the simulator is capable of simulating various logical configurations of storage disks coupled to the enterprise storage server unit, and wherein the simulator comprises of:
a plurality of simulated instances of the enterprise storage server unit that is under simulation in the simulator; and
a valid configuration checker, wherein the valid configuration checker determines validity of various configurations of the enterprise storage server unit based on the simulated instances of the enterprise storage server unit.

36. The system of claim 11, wherein the enterprise storage server is an enterprise storage server unit, wherein the simulator is capable of simulating physical elements, operations, and connectivity of the enterprise storage server unit, and wherein the simulator is capable of simulating various logical configurations of storage disks coupled to the enterprise storage server unit.

37. The system of claim 11, wherein the enterprise storage server is an enterprise storage server unit, and wherein the simulator comprises of:
a plurality of simulated instances of the enterprise storage server unit that is under simulation in the simulator; and a valid configuration checker, wherein the valid configuration checker determines validity of various configurations of the enterprise storage server unit based on the simulated instances of the enterprise storage server unit.

38. The system of claim 11, wherein the generated configuration information is sent from the system to the second computational device, wherein the second computational device includes information for manufacture and logical configuration of the enterprise storage server, the system further comprising:

manufacturing the enterprise storage server based on the configuration information sent to the second computational device;

configuring system attachments of the enterprise storage server based on the configuration information sent to the second computational device; and configuring logical settings of the enterprise storage server based on the configuration information sent to the second computational device.

39. The system of claim 38, wherein the enterprise storage server is an enterprise storage server unit, wherein the simulator is capable of simulating physical elements, operations, and connectivity of the enterprise storage server unit, wherein the simulator is capable of simulating various logical configurations of storage disks coupled to the enterprise storage server unit, and wherein the simulator comprises of:

a plurality of simulated instances of the enterprise storage server unit that is under simulation in the simulator; and a valid configuration checker, wherein the valid configuration checker determines validity of various configurations of the enterprise storage server unit based on the simulated instances of the enterprise storage server unit.

40. The article of manufacture of claim 21, wherein the enterprise storage server is an enterprise storage server unit, wherein the simulator is capable of simulating physical elements, operations, and connectivity of the enterprise storage server unit, and wherein the simulator is capable of simulating various logical configurations of storage disks coupled to the enterprise storage server unit.

41. The article of manufacture of claim 21, wherein the enterprise storage server is an enterprise storage server unit, and wherein the simulator comprises of:

a plurality of simulated instances of the enterprise storage server unit that is under simulation in the simulator; and a valid configuration checker, wherein the valid configuration checker determines validity of various configurations of the enterprise storage server unit based on the simulated instances of the enterprise storage server unit.

42. The article of manufacture of claim 21, wherein the generated configuration information is sent the second computational device, wherein the second computational device includes information for manufacture and logical configuration of the enterprise storage server, the operations further comprising:

manufacturing the enterprise storage server based on the configuration information sent to the second computational device;

configuring system attachments of the enterprise storage server based on the configuration information sent to the second computational device; and configuring logical settings of the enterprise storage server based on the configuration information sent to the second computational device.

43. The article of manufacture of claim 42, wherein the enterprise storage server is an enterprise storage server unit, wherein the simulator is capable of simulating physical elements, operations, and connectivity of the enterprise storage server unit, wherein the simulator is capable of simulating various logical configurations of storage disks coupled to the enterprise storage server unit, and wherein the simulator comprises of:

a plurality of simulated instances of the enterprise storage server unit that is under simulation in the simulator; and a valid configuration checker, wherein the valid configuration checker determines validity of various configurations of the enterprise storage server unit based on the simulated instances of the enterprise storage server unit.

44. The system of claim 31, wherein the enterprise storage server is an enterprise storage server unit, wherein the simulator is capable of simulating physical elements, operations, and connectivity of the enterprise storage server unit, and wherein the simulator is capable of simulating various logical configurations of storage disks coupled to the enterprise storage server unit.

45. The system of claim 31, wherein the enterprise storage server is an enterprise storage server unit, and wherein the simulator comprises of:

a plurality of simulated instances of the enterprise storage server unit that is under simulation in the simulator; and a valid configuration checker, wherein the valid configuration checker determines validity of various configurations of the enterprise storage server unit based on the simulated instances of the enterprise storage server unit.

46. The system of claim 31, wherein the generated configuration information is sent from the system to the second computational device, wherein the second computational device includes information for manufacture and logical configuration of the enterprise storage server, the system further comprising:

means for manufacturing the enterprise storage server based on the configuration information sent to the second computational device;

means for configuring system attachments of the enterprise storage server based on the configuration information sent to the second computational device; and means for configuring logical settings of the enterprise storage server based on the configuration information sent to the second computational device.

47. The system of claim 46, wherein the enterprise storage server is an enterprise storage server unit, wherein the simulator is capable of simulating physical elements, operations, and connectivity of the enterprise storage server unit, wherein the simulator is capable of simulating various logical configurations of storage disks coupled to the enterprise storage server unit, and wherein the simulator comprises of:

a plurality of simulated instances of the enterprise storage server unit that is under simulation in the simulator; and a valid configuration checker, wherein the valid configuration checker determines validity of various configurations of the enterprise storage server unit based on the simulated instances of the enterprise storage server unit.

* * * * *